(12) United States Patent
Tasdizen et al.

(10) Patent No.: US 10,893,297 B2
(45) Date of Patent: Jan. 12, 2021

(54) PROCESSING IMAGE DATA USING TIERED BIT-LAYERS

(71) Applicant: Apical Ltd, Cambridge (GB)

(72) Inventors: Ozgur Tasdizen, Cambridge (GB); Evren Cesur, Loughborough (GB)

(73) Assignee: Apical Ltd., Cambridge (GB)

( * ) Notice: Subject to any disclaimer, the term of this patent is extended or adjusted under 35 U.S.C. 154(b) by 290 days.

(21) Appl. No.: 15/933,048

(22) Filed: Mar. 22, 2018

(65) Prior Publication Data

US 2019/0297353 A1 Sep. 26, 2019

(51) Int. Cl.
*G06K 9/46* (2006.01)
*H04N 19/63* (2014.01)

(52) U.S. Cl.
CPC .................................. *H04N 19/63* (2014.11)

(58) Field of Classification Search
None
See application file for complete search history.

(56) References Cited

U.S. PATENT DOCUMENTS

2009/0092326 A1* 4/2009 Fukuhara ............ H04N 19/139
382/233
2015/0172722 A1* 6/2015 Takada .................. H04N 19/64
382/235
2018/0070095 A1* 3/2018 Chou ................... H04N 19/137
2019/0045206 A1* 2/2019 Keinert ............... H04N 19/645

OTHER PUBLICATIONS

Chrysafis, Christos, and Antonio Ortega. "Line-based, reduced memory, wavelet image compression." IEEE Transactions on Image processing 9.3 (2000): 378-389. (Year: 2000).*

* cited by examiner

*Primary Examiner* — Sean M Conner
(74) *Attorney, Agent, or Firm* — EIP US LLP

(57) ABSTRACT

Examples of the present disclosure relate to methods for processing image data. In one such example, data elements are received defining a portion of a line of pixels of an image, the image comprising one or more lines of pixels definable by one or more respective sets of data elements. In some cases, a transform operation is performed on the data elements to obtain a plurality of binary transform coefficients, wherein the transform operation is performed independently of data elements defining any other line of pixels. The plurality of transform coefficients is encoded as a sequence of tiered bit-layers, each bit-layer in the sequence of bit-layers comprising a set of bits corresponding to a given bit position in each of the plurality of transform coefficients. The encoded plurality of transform coefficients is output.

20 Claims, 13 Drawing Sheets

PROCESSING IMAGE DATA USING TIERED BIT-LAYERS

TECHNICAL FIELD

The present invention relates to methods, apparatus and computer-readable media for processing image data.

BACKGROUND

Compression of image or video data is an important consideration in many known systems. Image or video data may be compressed and encoded for transmission or storage. The encoded data may be subsequently decoded for further use, e.g. display.

Methods of compressing image or video data may however be computationally intensive and therefore require significant processing and power resources. Furthermore, methods of compressing image or video data may use significant amounts of memory. This may be exacerbated as video resolution and/or frame rate is increased. In addition, limitations in memory bandwidth can affect latency and cause bottlenecks when handling high resolution and/or frame rate image data.

It may be desirable to perform image or video compression when conveying data between different parts of a single entity. For example, an onboard parking aid system for a car may comprise cameras on the sides and/or rear of the car. High resolution video streams are captured by the cameras. It may be desired to display the captured views to the driver, e.g. on the dashboard of the car, at a visually high level of quality and in real-time. However, interconnects between the cameras and the dashboard may have a limited data rate and/or bandwidth. It is therefore desirable to provide efficient and effective image compression suitable for such systems.

SUMMARY

According to a first aspect of the present disclosure, there is provided a method for processing image data, the method comprising:
receiving data elements defining a portion of a line of pixels of an image, the image comprising one or more lines of pixels definable by one or more respective sets of data elements;
performing a transform operation on the received data elements to obtain a plurality of binary transform coefficients, wherein the transform operation is performed independently of data elements defining any other line of pixels;
encoding the plurality of transform coefficients as a sequence of tiered bit-layers, each bit-layer in the sequence of bit-layers comprising a set of bits corresponding to a given bit position in each of the plurality of transform coefficients; and
outputting the encoded plurality of transform coefficients.

According to a second aspect of the present disclosure, there is provided an apparatus for processing image data, the apparatus comprising:
a receiver module configured to receive data elements defining a portion of a line of pixels of an image, the image comprising one or more lines of pixels definable by one or more respective sets of data elements;
a transform module configured to perform a transform operation on the received data elements to obtain a plurality of binary transform coefficients, wherein the transform operation is performed independently of data elements defining any other line of pixels; and
an encoder module configured to:
encode the plurality of transform coefficients as a sequence of tiered bit-layers, each bit-layer in the sequence of bit-layers comprising a set of bits corresponding to a given bit position in each of the plurality of transform coefficients; and
output the encoded plurality of transform coefficients.

According to a third aspect of the present disclosure, there is provided a non-transitory computer-readable storage medium comprising a set of computer readable instructions which, when executed by at least one processor, cause the at least one processor to:
receive data elements defining a portion of a line of pixels of an image, the image comprising one or more lines of pixels definable by one or more respective sets of data elements;
perform a transform operation on the received data elements to obtain a plurality of binary transform coefficients, wherein the transform operation is performed independently of data elements defining any other line of pixels;
encode the plurality of transform coefficients as a sequence of tiered bit-layers, each bit-layer in the sequence of bit-layers comprising a set of bits corresponding to a given bit position in each of the plurality of transform coefficients; and
output the encoded plurality of transform coefficients.

According to a fourth aspect of the present disclosure, there is provided a method for processing image data, the method comprising:
receiving encoded data which, when decoded, is useable to obtain a plurality of binary transform coefficients representative of data elements defining a portion of a line of pixels of an image, the image comprising one or more lines of pixels definable by one or more respective sets of data elements, the plurality of transform coefficients being independent of data elements defining any other line of pixels;
decoding the received encoded data to obtain the plurality of transform coefficients, wherein the encoded data is decoded as a sequence of tiered bit-layers, each bit-layer in the sequence of bit-layers comprising a set of bits corresponding to a given bit position in each of the plurality of transform coefficients; and
performing an inverse transform operation on the plurality of transform coefficients to obtain the data elements.

According to a fifth aspect of the present disclosure, there is provided an apparatus for processing image data, the apparatus comprising:
a receiver module configured to receive encoded data which, when decoded, is useable to obtain a plurality of binary transform coefficients representative of data elements defining a portion of a line of pixels of an image, the image comprising one or more lines of pixels definable by one or more respective sets of data elements, the plurality of transform coefficients being independent of data elements defining any other line of pixels;
a decoder module configured to decode the received encoded data to obtain the plurality of transform coefficients, wherein the decoder module is configured to decode the received encoded data as a sequence of tiered bit-layers, each bit-layer in the sequence of bit-layers comprising a set of bits corresponding to a given bit position in each of the plurality of transform coefficients; and a transform module configured to perform an inverse transform operation on the plurality of transform coefficients to obtain the data elements.

According to a sixth aspect of the present disclosure, there is provided a non-transitory computer-readable storage medium comprising a set of computer readable instructions which, when executed by at least one processor, cause the at least one processor to:
receive encoded data which, when decoded, is useable to obtain a plurality of binary transform coefficients representative of data elements defining a portion of a line of pixels of an image, the image comprising one or more lines of pixels definable by one or more respective sets of data elements, the plurality of transform coefficients being independent of data elements defining any other line of pixels;
decode the received encoded data to obtain the plurality of transform coefficients, wherein the encoded data is decoded as a sequence of tiered bit-layers, each bit-layer in the sequence of bit-layers comprising a set of bits corresponding to a given bit position in each of the plurality of transform coefficients; and
perform an inverse transform operation on the plurality of transform coefficients to obtain the data elements.

Further features and advantages of the invention will become apparent from the following description of preferred embodiments of the invention, given by way of example only, which is made with reference to the accompanying drawings.

DETAILED DESCRIPTION

Figure 1:
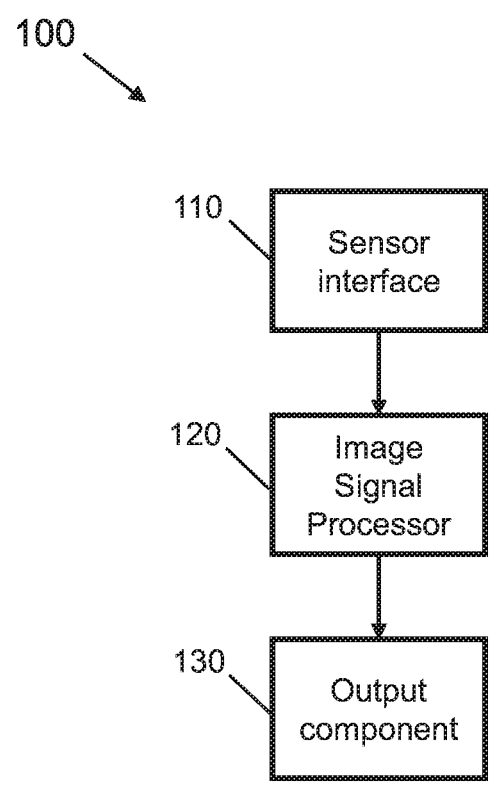
FIG. 1 shows schematically an apparatus for implementing an image processing pipeline.

FIG. 1, provided for context, shows schematically an apparatus 100 for implementing an image processing pipeline. The apparatus 100 may form part of a "System on Chip" (SoC) arrangement. Such a SoC may be for capturing images or videos, for example.

The apparatus 100 comprises a sensor interface 110. The sensor interface 110 is configured to receive signal data from one or more sensors (not shown). For example, the sensor interface 110 may be configured to receive image data from an image sensor communicatively coupled to the sensor interface 110. The received signal data may comprise analog or digital data. Such an image sensor may comprise a plurality of sensor pixels, a given sensor pixel being configured to output signal data corresponding to that sensor pixel. An image sensor may output data in a raster scan, or line-by-line, manner, wherein each line comprises a plurality of pixels. The signal data received by the sensor interface 110 may comprise raw sensor data. For example, the sensor data may comprise raw image data. Raw image data comprises unprocessed or minimally processed data generated by an image sensor.

The apparatus 100 further comprises an image signal processor 120. The image signal processor 120 is communicatively coupled to the sensor interface 110. The image signal processor 120 may be implemented using machine readable instructions and suitably programmed or configured hardware, such as circuitry. The image signal processor 120 may be configured to implement certain methods described herein. In examples, the image signal processor 120 is configured to process raw image data received from a sensor via the sensor interface 110. The image signal processor 120 can include a microprocessor, microcontroller, processor module or subsystem, programmable integrated circuit, programmable gate array or other computing device.

The apparatus 100 further comprises an output component 130. In examples, the output component 130 comprises a component of a memory. The memory may comprise a framebuffer. The memory may be arranged to store image data, for example one or more frames of a video, and/or compressed data derived based on image data. The memory may receive image data and/or compressed data from the image signal processor 120. In other examples, the output component 130 comprises a component of a transmitter. The transmitter may be arranged to receive image data and/or compressed data from the image signal processor 120 and transmit the data to at least one further entity. The transmitter may comprise a network transmitter, for example.

The apparatus 100 may comprise more, fewer and/or different components than those shown in the example of FIG. 1.

Figure 2:
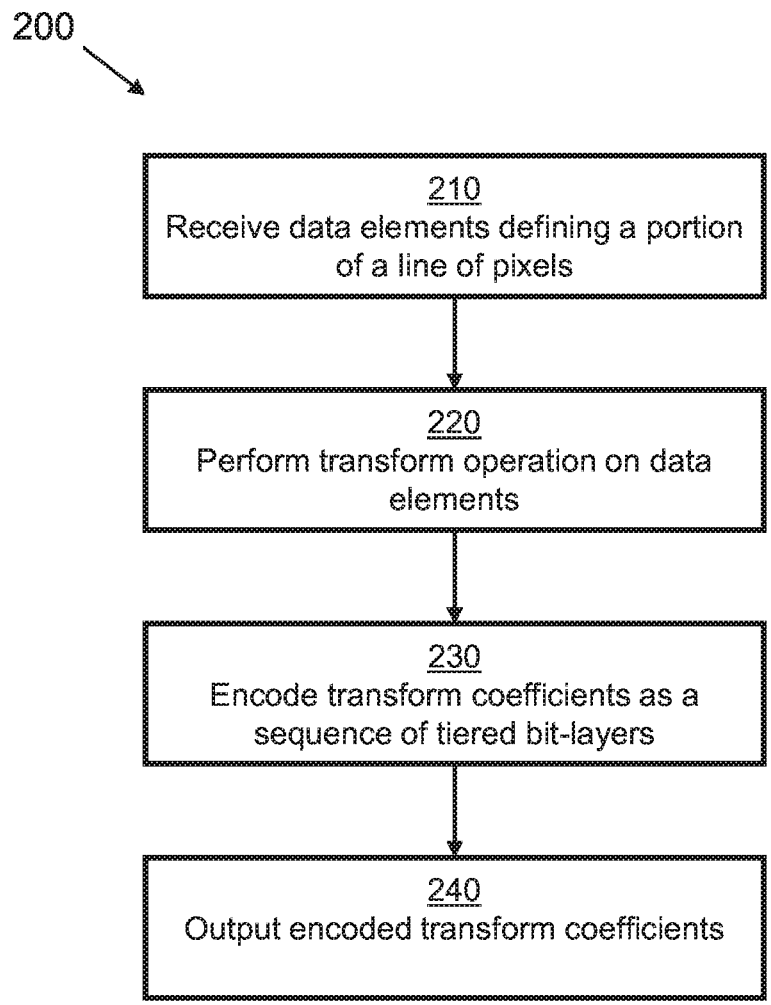
FIG. 2 shows schematically a method of processing image data.

FIG. 2 shows schematically a method 200 for processing image data according to an aspect of the present disclosure. At least one portion of the method 200 may be implemented by the image signal processor 120 shown in FIG. 1.

In an example, at least one portion of the method 200 is implemented by executable code, stored on a non-transitory storage medium, that includes instructions, that when executed by at least one processor, causes the at least one processor to perform the at least one portion of the method 200 described herein. In another case, at least one portion of the method 200 is implemented by at least one ASIC. The ASIC may be standard, fully customized or partially customized. In one example, the ASIC may have a structured design. The ASIC may comprise at least one microprocessor and/or at least one memory block. In another example, the ASIC comprises at least one gate array such as a field-programmable gate array. The field-programmable gate array may comprise an array of programmable logic blocks and a hierarchy of reconfigurable interconnects. The array of programmable logic blocks may, in some examples, comprise memory elements such as flip-flops. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 210, data elements are received. The received data elements define a portion of a line of pixels of an image. The image comprises one or more lines of pixels definable by one or more respective sets of data elements. In some examples, the image is a frame of a video comprising multiple such frames. In examples where the image comprises multiple lines of pixels, each of the lines of pixels may be parallel to each other. In examples, a line of pixels of an image comprises a row of pixels. Such a row of pixels may extend across the entire width of the image or across a portion of the entire width. In other examples, a line of pixels of an image comprises a column of pixels. Such a column of pixels may extend across the entire height of the image or across a portion of the entire height.

In examples, the received data elements comprise raw image data output from an image sensor. The data elements may be received from the image sensor, for example via a sensor interface such as the sensor interface 110 shown in FIG. 1. Operating on raw image data enables the described methods to be performed by an image signal processor communicatively coupled to an image sensor and arranged to receive signal data either directly or indirectly from the image sensor. Further, operating on raw image data reduces information loss compared to a case in which the image data is pre-processed and/or compressed prior to performing the described methods. Operating on raw image data instead of pre-processed and/or compressed image data may also reduce a computationally complexity in performing the described methods, thereby reducing or simplifying hardware requirements, as such a pre-processing and/or compression step may be computationally expensive in terms of processing power, time and/or memory.

At block 220, a transform operation is performed on the received data elements to obtain a plurality of binary transform coefficients. "Binary" is used herein to refer to a value that is representable and/or encodeable as a sequence of bits, ranging from a most significant to a least significant bit. As such, each of the plurality of transform coefficients may comprise a multi-bit value. In some examples, the plurality of transform coefficients is representative of frequency components of the received data elements. In other words, the transform operation may transform the received data from a spatial domain to a frequency domain. In other examples, the transform operation transforms the received data to a domain other than a frequency domain.

In some examples, performing the transform operation comprises performing a Discrete Wavelet Transform (DWT) operation. The DWT may comprise a Haar transform operation, as described in more detail below.

The transform operation is performed independently of data elements defining any other line of pixels. As such, only pixels from a single line are used to obtain the transform coefficients. In other words, information derived from pixels of other lines is not taken into account when performing the transform operation. By operating on pixels from a single line, the use of line buffers may be avoided. Line buffers may be used to store one or more lines of pixels in memory. Line buffers may be required in block-based image compression techniques. Implementing line buffers is costly and intensive in terms of memory and/or memory bandwidth requirements. Such a cost is exacerbated when processing raw, uncompressed image data, for example at 8K resolution, where a relatively large amount of data is required to store even a single line of pixels. Reducing the use of line buffers, or avoiding their use altogether, therefore reduces memory requirements when processing and/or compressing image data. Reducing an amount of memory and/or memory bandwidth allows the methods described herein to be implemented with relatively low cost and/or simple hardware, which may be a consideration in many systems where such image processing is performed, e.g. on a cellular phone or other device having a relatively small form factor, or in an onboard or portable system such a parking aid system for a car.

Processing data elements defining a single line of pixels, or a portion of a single line of pixels, independently of data elements defining any other line of pixels, facilitates the processing of data received from an image sensor. Image sensors typically output pixel data in a raster scan manner, namely line-by-line. Processing a single line of pixel data independently of other lines of pixel data therefore reduces latency, in that a line of pixel data can be received from the sensor and processed without having to wait for other lines to be received, as well as reducing a required amount of memory that would be used for storing such other lines of pixel data. Processing image or video data in accordance with the methods described herein may therefore be performed in substantially real-time, as soon as the image or video data is captured by the sensor. Certain methods described herein are therefore well suited for use with image sensors, e.g. comprised in cameras, and may be implemented early in the image capture pipeline, e.g. at a frontend prior to the captured image data being written to memory. Image compression may therefore be performed on raw image data before data is written to a framebuffer.

At block 230, the plurality of transform coefficients are encoded as a sequence of tiered bit-layers. Each bit-layer in the sequence of bit-layers comprises a set of bits corresponding to a given bit position in each of the plurality of transform coefficients. As such, different bit-layers in the sequence of bit-layers correspond to different bit significances, ranging from a set of most significant bits to a set of least significant bits. The sequence of bit-layers is tiered in that the bit-layers are representable as a hierarchy, with more significant bit-layers arranged above less significant bit-layers in the hierarchy. A bit-layer may comprise a bit-row. A bit-row may be considered a one-dimensional row of bits having a common significance across the plurality of transform coefficients. In some examples, a bit-layer comprises a bit-plane. A bit-plane may be considered a two-dimensional plane of bits having a common significance across the plurality of transform coefficients.

At block 240, the encoded plurality of transform coefficients is outputted. In examples, the encoded plurality of transform coefficients is outputted to a memory, which is an example of an output component such as the output component 130 shown in FIG. 1. In some examples, the encoded plurality of transform coefficients is outputted to a framebuffer. The encoded plurality of transform coefficients may then be extracted, decoded and used for further processing at a later point in time. In some examples, the encoded plurality of transform coefficients is outputted for transmission to at least one further entity. The at least one further entity may comprise a decoder device. The encoded plurality of transform coefficients may be outputted for transmission via a network, for example. In some examples, the encoded plurality of transform coefficients is outputted both to a memory and for transmission to at least one further entity.

By encoding the transform coefficients on a bit-layer by bit-layer basis, bits of the transform coefficients having a greater significance can be prioritized over bits of the transform coefficients having a lower significance, thus allowing visual quality to be maintained for higher compression levels. For example, when a relatively limited bit-budget is available for the encoding of the transform coefficients, due to a relatively aggressive compression level, the bit-budget can be spent on the most significant bit-layers of the coefficients at the expense of the least significant bit-layers.

In some examples, the method 200 comprises identifying bits encodeable as a subset of bit-layers from the sequence of bit-layers. The bits are identified on the basis of each of the bits having a predetermined value. In examples, the predetermined value is zero. The subset of bit-layers includes a bit-layer comprising a most significant bit of each of the plurality of transform coefficients. In other words, where the tiered sequence of bit-layers ranges from a most significant bit-layer to a least significant bit-layer, the most significant bit-layer and the least significant bit-layer containing the most and least significant bits of each of the transform coefficients, respectively, the subset of bit-layers includes the most significant bit-layer. The subset of bit-layers may be contiguous in the sequence of bit-layers. For example, if the sequence of bit-layers comprises 12 bit-layers, ranging from a most significant bit-layer to a least significant bit-layer, the subset of bit-layers may comprise the first, second, third and fourth bit-layers. The identified bits are omitted in the encoding of the plurality of transform coefficients. As such, the subset of bit-layers is not included in the encoding. The subset of bit-layers may be discarded, for example.

In some examples, a bit-layer indicator is included in the encoding of the plurality of transform coefficients. The bit-layer indicator may be arranged in a header of the encoded data. The bit-layer indicator indicates the number of bit-layers in the subset of bit-layers. In other words, the bit-layer indicator indicates the number of bit-layers that are omitted from the encoding. The bit-layer indicator may have a fixed bit-length. In an example, the bit-layer indicator has a bit-length of 3 bits. In another example, the bit-layer indicator has a bit-length of 4 bits, it being understood that other bit-lengths may be used in other examples. The bit-length of the bit-layer indicator may be dependent on the input pixel depth. In an example, the bit-layer indicator is arranged to indicate a bit-layer of the sequence of bit-layers that contains the first most significant non-zero value, as will be described in more detail below.

In some examples, the method 200 comprises obtaining a further binary transform coefficient corresponding to the received data elements. The further transform coefficient may be obtained as a result of the transform operation performed at block 220. In other words, the transform operation may be used to derive the plurality of transform coefficients and a further transform coefficient. The further transform coefficient is encoded as a sequence of bits. The number of bits of the further transform coefficient that are included in the encoding of the further transform coefficient is greater than the number of bit-layers that are included in the encoding of the plurality of transform coefficients. In some examples, every bit of the further transform coefficient is included in the encoding.

As an illustrative example, each of the plurality of transform coefficients and the further transform coefficient may be a 12-bit value. The further transform coefficient may be encoded as a sequence of 12 bits. The plurality of transform coefficients are encodeable as a sequence of 12 bit-layers. However, a subset of the sequence of bit-layers, including the most significant bit-layer, is omitted from the encoding. Thus, fewer than 12 bit-layers are included in the encoding of the plurality of transform coefficients, in contrast with the encoding of the further transform coefficient.

In some examples, the plurality of transform coefficients comprises a plurality of detail coefficients. The detail coefficients may be derived based on differences between at least some of the received data elements. The detail coefficients may be referred to as "difference coefficients" or "AC coefficients". The further transform coefficient, on the other hand, comprises an average coefficient. The average coefficient may be derived based on one or more averages between at least some of the received data elements. The average coefficient may be referred to as an "approximation coefficient" or "DC coefficient".

In some examples, the method 200 comprises obtaining an additional binary transform coefficient corresponding to the received data elements. The additional transform coefficient may be obtained as a result of the transform operation performed at block 220, for example. The additional transform coefficient may comprise a detail coefficient. In such examples, the method comprises determining whether the additional transform coefficient is to be omitted from the encoding of the plurality of transform coefficients or included in the encoding. In a case where the additional transform coefficient is emitted from the encoding, every bit of the additional transform coefficient may be omitted.

Determining whether the additional transform coefficient is to be omitted or included is performed on the basis of the value of the additional transform coefficient and a bit-budget allocated for the encoding of the plurality of transform coefficients. In some examples, an omitted coefficient identifier is including in the encoding. In response to determining that the additional transform coefficient is to be omitted from the encoding, the omitted coefficient identifier may be included to identify the additional transform coefficient that is to be omitted. As such, an indication may be provided to a decoder to inform the decoder of the omitted coefficient.

In some examples, the method 200 comprises receiving further data elements defining a further portion of the line of pixels of the image. As such, the data elements received at block 210 and the further data elements correspond to the same line of pixels. For example, the data elements received at block 210 may correspond to a first part of a row of pixels and the further data elements may correspond to a second part of the same row of pixels. In an example, the portion of the line of pixels and the further portion of the line of pixels may be contiguous portions of the line of pixels. That is, the portion and the further portion may share a common interface.

A transform operation may be performed on the received further data elements to obtain a further plurality of binary transform coefficients. The further plurality of transform coefficients may be representative of frequency components of the received further data elements. The plurality of transform coefficients obtained at block 220 may be compared with the further plurality of transform coefficients. One or both of the plurality of transform coefficients and the further plurality of transform coefficients may be encoded based on the comparing. In other words, the comparison may influence the encoding of the plurality of transform coefficients, the further plurality of transform coefficients, or both the plurality of transform coefficients and the further plurality of transform coefficients. In some examples, based on the comparing, a first bit-budget is allocated for the encoding of the plurality of transform coefficients and a second bit-budget is allocated for the encoding of the further plurality of transform coefficients. The first and second allocated bit-budgets may be different from one another or the same as one another.

Various aspects of the above methods will now be described in more detail in accordance with examples.

Figure 3:
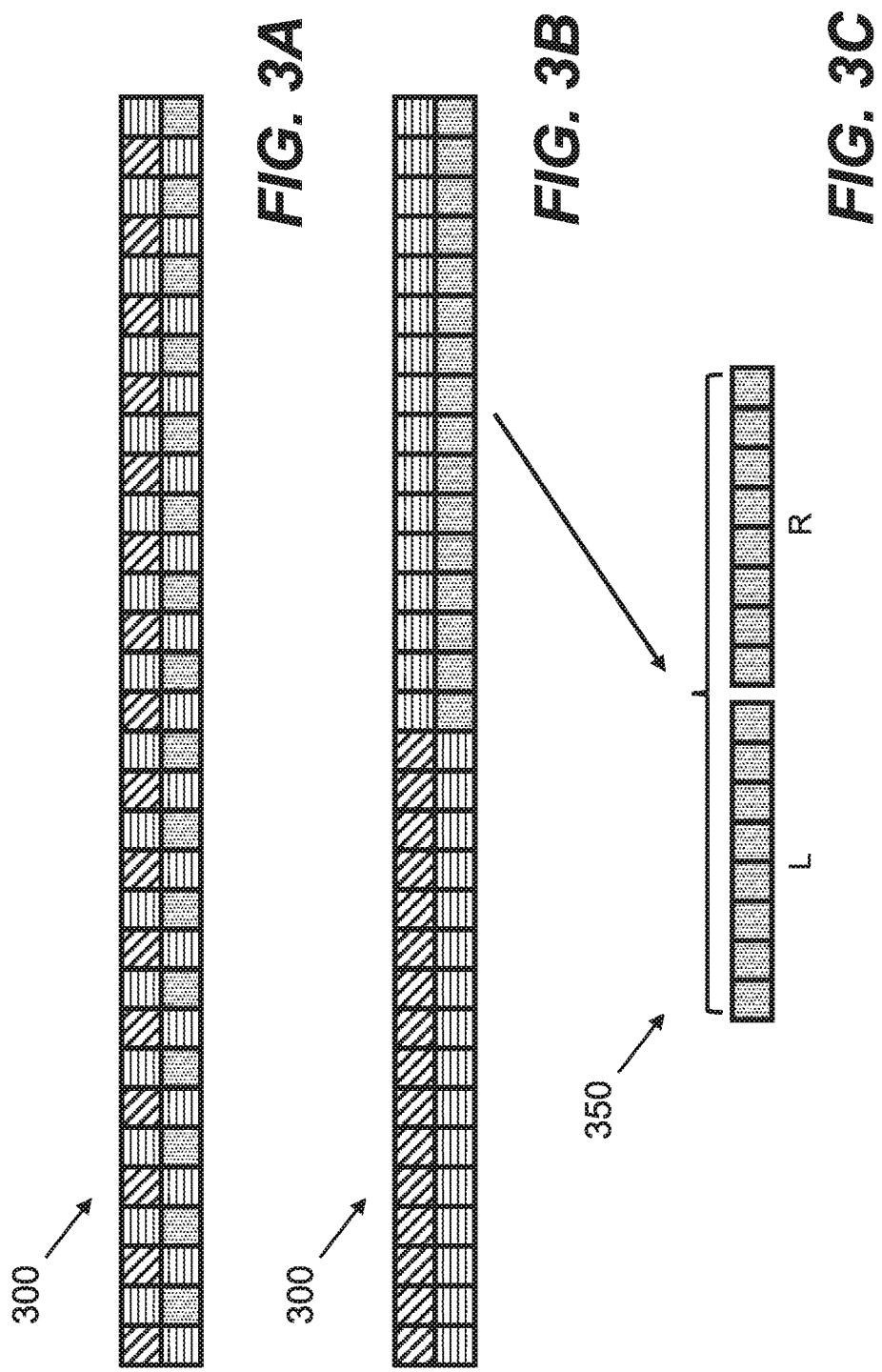
FIGS. 3A to 3C show schematically a group of image data elements.

FIG. 3A shows a group of image data elements 300 according to an example. In this example, the image data elements 300 correspond to pixels received from an image sensor or sensor array. The pixels are received in a raw image format. The image data elements 300 may be captured using a color filter array. A color filter array comprises a mosaic of color filters arranged over sensor pixels to capture color information. In this example, a Bayer filter is used as the color filter array. As such, the filter pattern is 50% green (shown with horizontal line shading), 25% red (dot shading) and 25% blue (diagonal line shading). The image data elements 300 are depicted as two rows of pixels, the first row alternating blue and green, the second row alternating red and green. Other color filter arrays may be used in other examples. In some examples, monochromatic image pixels are obtained.

Each of the image data elements 300 may be represented as a binary number, or a sequence of bits. The depth of the data elements, or the number of bits per data element, e.g. per pixel, may be set by the image sensor. In some examples, the number of bits per data element is configured after the data elements are received from the image sensor. In this example, 12 bits per pixel (bpp) are used. Other numbers of bits per pixel can be used in other examples, for example 10, 14 or 16 bpp may be used.

FIG. 3B shows the group of image data elements 300 as depicted in FIG. 3A rearranged into constituent color channels. In this example, each row or line of the rearranged data elements comprises 32 pixels divided into two sets of 16 pixels having the same color. As such, there are 16 pixels per color channel in this example. Each color channel may be processed independently in the methods described herein.

FIG. 3C shows image data elements 350 corresponding to one constituent color channel from the group of image data elements 300. In this example, the image data elements 350 correspond to the red color channel, it being understood that the described methods may additionally or alternatively be implemented using image data elements corresponding to other color channels. The image data elements 350 comprise 16 pixels in this example. The image data elements 350 define pixels from a single line, namely the bottom line of the two lines shown in FIGS. 3A and 3B. None of the image data elements 350 are taken from the top line in this example.

The image data elements 350 are divided into two portions. Each portion comprises 8 pixels in this example. Where the line of pixels comprises a row of pixels, the two portions may be denoted as "left" and "right" portions. In examples where the line of pixels comprises a column of pixels, the two portions may instead be denoted as "top" and "bottom" portions. Each portion may be processed independently and sharing the same processing hardware. The dividing of the groups of image data elements of a single color channel into portions allows an encoding bit-budget to be distributed between the different portions, as will be described in more detail below. Image data elements may be divided into more than two portions in some examples.

In examples where the input image width is not divisible by the size of the line of pixels (e.g. 16), missing pixels for the last input line of pixels can be padded by zeros.

Figure 4:
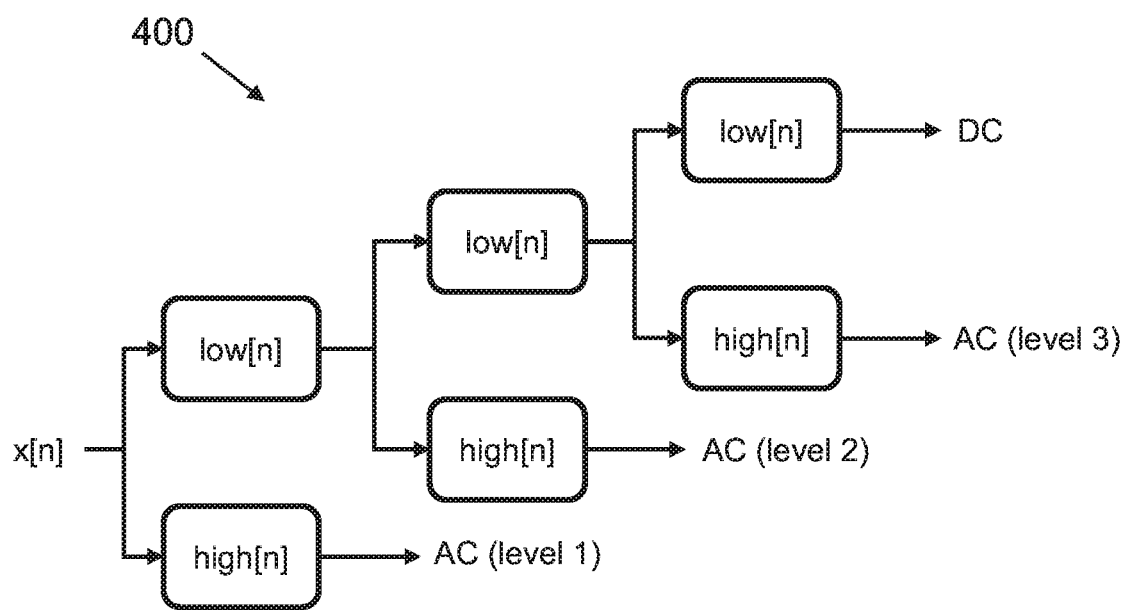
FIG. 4 shows schematically a transform process according to an example.

FIG. 4 shows schematically a transform process 400 according to an example.

In this example, the transform process 400 comprises a 3-level Haar transform. A Haar transform is a type of Discrete Wavelet Transform (DWT). The Haar transform may be computationally less complex than other types of DWTs. As such, a Haar transform may be implemented using relatively low cost hardware resources. In particular, the Haar transform can be implemented using only additions and subtractions, rather than multiplications which may be more computationally expensive than additions and subtractions.

The transform process 400 receives as input samples, x[n], the image data elements defining a portion of a line of pixels, for example one of the "left" and "right" portions depicted in FIG. 3C. As such, the input to the transform 400 comprises 8 image data elements, it being understood that other numbers of image data elements could be used in other examples.

The Haar transform shown in FIG. 4 comprises a series or cascade of low pass filters (low[n]) and high pass filters (high[n]). A low pass filter in this context involves computing an average of input samples. A high pass filter in this context involves computing differences between input samples. Outputs of the low pass filter may be referred to as "approximation coefficients" or "average coefficients". Outputs of the high pass filter may be referred to as "detail coefficients" or "difference coefficients". By cascading three levels of Haar filters as depicted in FIG. 4, a relatively small coefficient depth and uniform distribution of energy in the coefficient distribution may be achieved, compared to other types and forms of transform.

The output of the 3-level Haar transform comprises a level 3 approximation coefficient (referred to herein as a "DC coefficient") and levels 1, 2 and 3 detail coefficients (referred to herein as "AC coefficients"). The DC coefficient represents the average value of the input pixels to the transform process 400. As it represents an average, the DC coefficient is a positive value. The AC coefficients represent inter-element differences at the 3 different levels of the Haar transform. As they represent differences, the AC coefficients may each be positive or negative values. The output length of the Haar transform is the same as the input length. As such, an input sample of 8 pixels results in 8 output coefficients comprising a DC coefficient and 7 AC coefficients. Of the 7 AC coefficients, there is 1 AC coefficient from level 3, 2 AC coefficients from level 2, and 4 AC coefficients from level 1.

Registers can be used to store both the intermediate and the final results of the multi-level Haar transform. Internal precision of the transform hardware is increased after each addition/subtraction. When the coefficients are output, they may be reduced to the input pixel depth. Level 1 coefficients may be truncated, e.g. by shifting to the right by 1 bit. Level 2 and level 3 coefficients may be rounded.

In some examples, the computation of the 3-level Haar transform is performed in two clock cycles. Additions may be performed on the first clock cycle and subtractions on the second clock cycle. On the first clock cycle, approximation coefficients (a1, a2, a3) are calculated and stored as intermediate results, except for a3, which is the DC coefficient and a final result. Using the approximation coefficients (a1, a2), detail coefficients (d1, d2, d3) are calculated on the second clock cycle.

Storage of coefficients may be performed in parallel when the transform operations of related coefficients are completed simultaneously, and the coefficients may then be read out in serial when generating an output stream. In some examples, the coefficients are read out in parallel. In some examples, multiplexers are used to select between serial and parallel read outs. Coefficient storage may register AC coefficients in big-endian format.

Other types of transform than a DWT transform may be used in other examples. For example, a Discrete Cosine Transform (DCT) may be used. A DCT may concentrate more energy in the coefficient distribution towards the low frequency coefficients. However, a more uniform coefficient distribution obtainable with a Haar transform may allow more bit-layers of the AC coefficients to be omitted, since the value of the greatest magnitude AC coefficient (corresponding to the first bit-layer to be encoded) is likely to be smaller than a case in which a DCT is used. A greater level of compression without a loss of visual information may therefore be achieved by a Haar transform than by a DCT. Further, a DCT requires multiplication operations, which are more computationally expensive than the addition operations employed by the Haar transform. Therefore the Haar transform is both simple to implement, relatively cheap in terms of processing resources, and allows for substantial compacting of AC coefficients without a loss in visual detail.

Figures 5A, 5B:
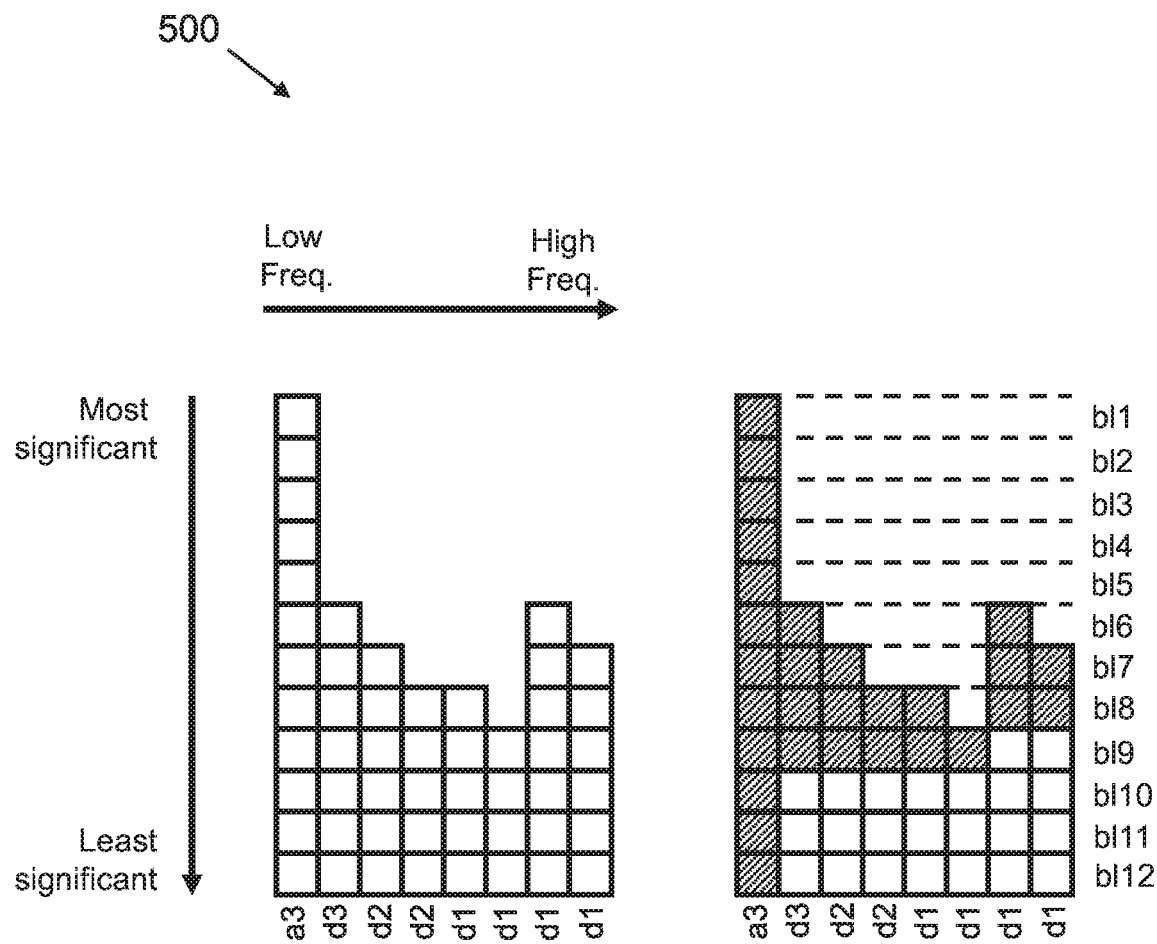
FIGS. 5A and 5B show schematically transform coefficients for encoding according to an example.

FIGS. 5A and 5B show schematically transform coefficients 500 for encoding according to an example.

FIG. 5A, firstly, shows transform coefficients that are obtained by a transform process such as the transform process 400 depicted in FIG. 4. The transform coefficients comprise a level 3 approximation coefficient (a3), a level 3 detail coefficient (d3), two level 2 detail coefficients (d2) and four level 1 detail coefficients (d1). There is thus one DC coefficient and seven AC coefficients. The transform coefficients are representative of frequency components of the input samples to the transform operation. The level 3, level 2 and level 1 coefficients are representative of low, medium and high frequency components, respectively. Each of the transform coefficients has a depth of 12 bits, in a case where the pixel depth is also 12 bits, ranging from a most significant bit to a least significant bit, as depicted along the vertical axis of FIG. 5A. The most significant bit is the bit position having the greatest value, the next most significant bit is the bit position having the next greatest value, and so on.

In the example shown in FIGS. 5A and 5B, the transform coefficients are arranged as a sequence of tiered bit-layers. Each bit-layer in the sequence of bit-layers comprises a set of bits corresponding to a given bit position in each of the transform coefficients. For example, bit-layer bl1 contains the most significant bit from each of the transform coefficients, bit-layer bl2 contains the next most significant bit from each of the transform coefficients, and so on, down to bit-layer bl12 which contains the least significant bit from each of the transform coefficients.

FIG. 5B shows, using diagonal shading, bits of the transform coefficients that are output, according to the example of FIG. 5A. Bits of the transform coefficients that are not output are shown without shading.

As can be seen from FIG. 5B, every bit of the DC coefficient, a3, is output in this example. In other examples, at least one bit of the DC coefficient is not output, as described in more detail below. The DC coefficient is an example of a further transform coefficient, relative to a plurality of transform coefficients comprising the AC coefficients.

The AC coefficients are output on a bit-layer by bit-layer basis, from low frequency to high frequency, until an allocated or predetermined bit-budget has been reached. The bit-budget is based on a desired compression level. In this example, the last bit to be output is the $9^{th}$ most significant bit of the $5^{th}$ AC coefficient.

As such, the number of bits of the DC coefficient that are included in the encoding is greater than the number of bit-layers of the AC coefficients that are included in the encoding. Since the DC coefficient represents an average or approximation value, and typically has a greater energy, i.e. higher magnitude, than any of the AC coefficients, the input data elements may be encoded and/or recovered with a greater accuracy by including more bits of the DC coefficient than are included for the AC coefficients. In other words, losing information in the DC coefficient may affect the accuracy with which the data elements can be recovered to a greater extent than losing information in the AC coefficients.

In this example, the bits of the DC coefficient are output prior to any bits of the AC coefficients being output. In other examples, the bits of the DC coefficient are grouped with the bits of the AC coefficients, and together the DC coefficient and AC coefficients are output on a bit-layer by bit-layer basis.

In some examples, the output of the AC coefficients is preceded by a set of sign-bits arranged to indicate whether given AC coefficients are positive or negative. Each AC coefficient may have a corresponding sign-bit. The set of sign-bits may be output before the bit-layers of the AC coefficients. Since the DC coefficient is positive, no sign-bit may be used for the DC coefficient. The coding of sign-bits alongside the values of the AC coefficients may be referred to as a signed magnitude or signed number representation.

In this example, the bit-layers corresponding to the first five most significant bits of the AC coefficients do not contain any non-zero values. This is illustrated in FIGS. 5A and 5B with an absence of blocks in bit-layers bl1 to bl5. In other words, each of the AC coefficients contains at least five leading zeros. As such, the first five bit-layers in this example do not contain any useful information about the values of the AC coefficients. These bit-layers may be discarded or otherwise omitted from encoding without any loss in visual information. These five bit-layers may be considered to form a subset of the overall sequence of twelve bit-layers. The subset of bit-layers includes the bit-layer comprising the most significant bit of each of the AC coefficients, bl1. The subset of bit-layers is sequential or contiguous, in that the subset comprises the first to the fifth bit-layer inclusively. The bits comprised in the subset of bit-layers may be omitted from the encoding of the AC coefficients, thereby reducing an amount of data to be stored and/or transmitted. In this example, the first bit-layer for the AC coefficients to be output is b16, which comprises two non-zero values, corresponding to the first and sixth AC coefficients. By omitting five bit-layers of seven AC coefficients, 5×7=35 bits fewer are output compared to a case in which the most significant bit-layers containing only zeros are not omitted.

OR reduction may be performed to determine whether a non-zero bit is present in a given bit-layer. OR reduction can be performed with 6 OR gates per bit-layer, since each bit-layer comprises 7 values. In one example, OR reduction is performed in serial, bit-layer by bit-layer across the sequence, starting with the bit-layer containing the most significant bits. In this case, bit-layers may be discarded one after another until a bit-layer containing a non-zero bit is found, e.g. when the OR reduction gives a positive result. Discarding a bit-layer may comprise shifting the stored coefficients to the right by one bit. In another example, OR reduction is performed in parallel, analyzing multiple bit-layers at once.

In some examples, a header is included in the encoded transform coefficients. The header may include a bit-layer indicator arranged to indicate the number of bit-layers that are omitted from the encoding, namely the number of bit-layers in the subset of bit-layers. In the example shown in FIG. 5B, the bit-layer indicator has a value of 5, indicating that the first 5 most significant bit-layers are omitted from the encoding. The bit-layer indicator in this example has a bit-length of 3, although other bit-lengths can also be used. In some examples, the bit-layer indicator has a fixed bit-length. In other examples, the bit-layer indicator has a variable bit-length.

In some examples, the bit-layer indicator is arranged to indicate a bit-layer that contains the first most significant non-zero value. In the example shown in FIG. 5B, the bit-layer indicator may therefore have a value of 6, indicating that the $6^{th}$ bit-layer contains the first most significant non-zero value of the AC coefficients.

In some examples, the bit-layer indicator does not indicate the bit-layer containing the first most significant non-zero value. For example, the bit-layer indicator may have a maximum value that can be taken, defined by the bit-length of the bit-layer indicator. For a bit-length of 3 bits, the maximum value may be 7. Thus in some cases there may be a greater number of bit-layers containing only zeros (e.g. more than 7 bit layers) than can be indicated by the bit-layer indicator. In this case, the bit-layer indicator is given its maximum value (e.g. 7), and only those bit-layers that are indicated by the bit-layer indicator (e.g. the first 7 bit-layers) are omitted. Therefore, the first bit-layer to be included in the encoding might not be the bit-layer containing the first most significant non-zero value, but might instead contain only zeros.

In the example shown in FIG. 5B, the compression level is set to 2:1, or 50% compression. The coefficient depth is 12 bits, and the output bit-budget is therefore (12×8)/2=48 bits. The header comprising the bit-layer indicator comprises 3 bits, reducing the available bit-budget to 45 bits. 12 bits are allocated to encoding the DC coefficient in its entirety, and 7 bits are used as sign-bits for the AC coefficients. Thus the bit-budget for encoding the values of the AC coefficients is 26 bits in this case. Encoding of the AC coefficients starts at the $6^{th}$ bit-layer and proceeds on a bit-layer by bit-layer basis until the bit-budget is used. Therefore the $10^{th}$, $11^{th}$ and $12^{th}$ bit-layers of the AC coefficients are not output, and nor are the final two bits of the $9^{th}$ bit-layer, which correspond to the highest frequency AC coefficients.

In this example, the DC coefficient is encoded with as many bits as the input pixel depth, namely 12 bits. However, as described with reference to FIG. 3C above, left and right portions of a line of pixels may be processed separately. In such cases, for one portion, e.g. the left portion, an absolute value of the DC coefficient may be output, and for the other portion, e.g. the right portion, a difference between the DC coefficients for the two portions may be output. Thus less data may be used to encode the DC coefficients compared to a case in which the absolute values are output for both portions.

Whether the DC-difference or the absolute DC value for a given portion is output may be indicated using a bit in the header of that portion. For example, if the bit in the header is set to 0, the absolute value of the DC coefficient is outputted. If the bit in the header is set to 1, the DC-difference is output. In this case, a sign bit may be used to encode the DC-difference, along with a set of one or more bits representing the DC-difference value. The depth of the DC-difference value may depend on the input pixel depth. In an example, the depth of the DC-difference value is set to half of the input pixel depth. In another example, the depth of the DC-difference value is a parameter input by a user.

In another case, the least significant bit of the DC coefficient of the given portion is replaced with a flag to indicate whether the absolute value or the DC-difference is being output. This approach reduces overheads associated with an extra header bit, although there is a trade-off in that the loss of the least significant bit means that the outputted value is an even number regardless of whether or not the actual value of the DC coefficient or the DC-difference is odd or even.

In another example, the DC-difference is output for selected parts of the image. If the difference between DC coefficients for left and right portions falls within a pre-defined threshold, the encoder may output the DC-difference. This case may be indicated by setting the bit-layer indicator in the header of one of the left and right portions (indicating the number of omitted bit-layers) to its maximum value, e.g. 111 for a 3 bit indicator or 1111 for a 4 bit indicator. If the difference between DC coefficients for left and right portions is greater than the predefined threshold, the absolute value of the DC coefficient is output instead of the DC-difference. In this case, the bit-layer indicator is limited to its maximum value minus one. In other words, fewer bit-layers can be indicated as being omitted. However, this technique does not require additional overheads in the form of extra header bits, nor does it result in a loss of information due to the replacement of the least significant bit of the DC coefficient.

Figures 6A, 6B:
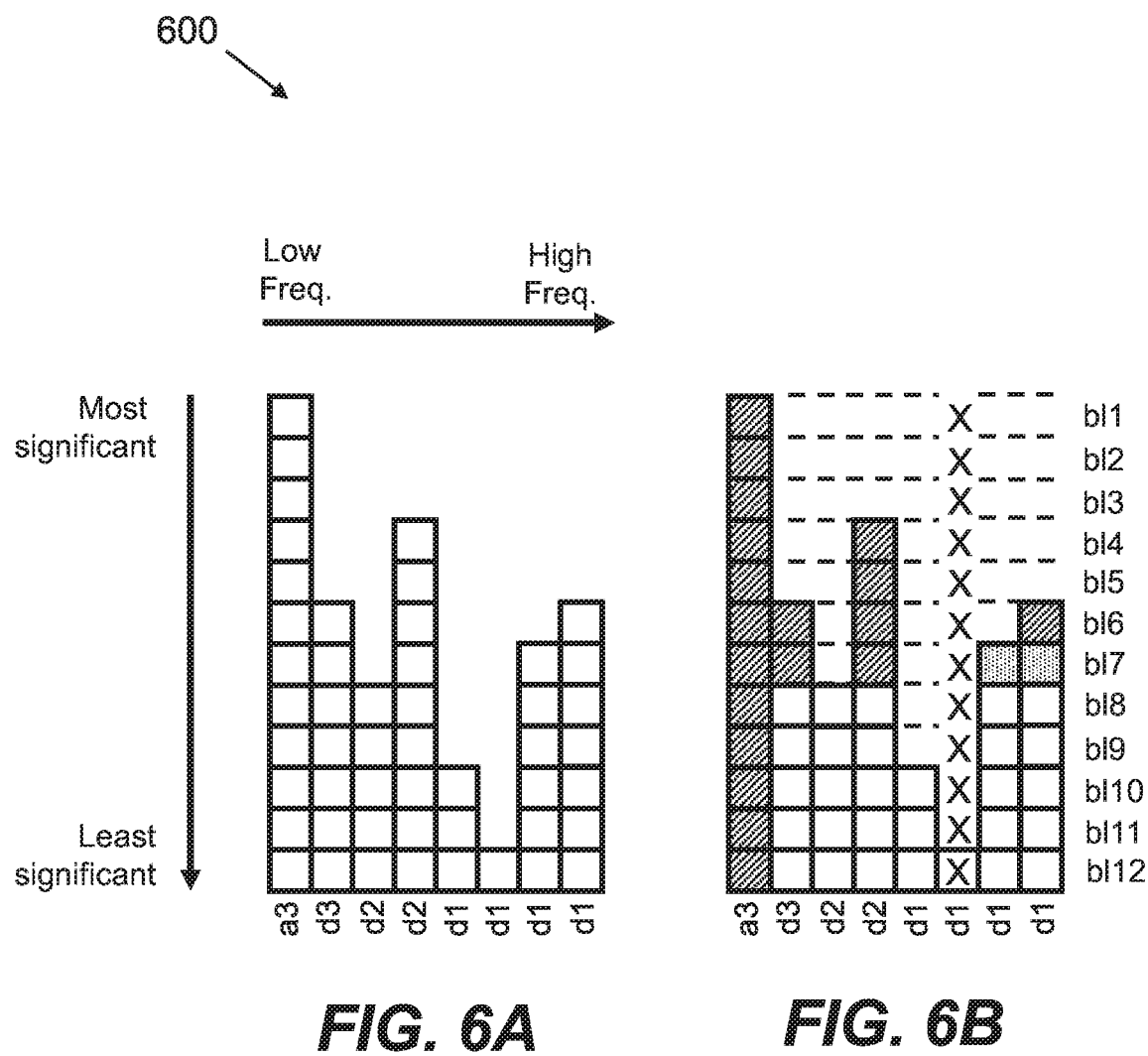
FIGS. 6A and 6B show schematically transform coefficients for encoding according to an example.

FIGS. 6A and 6B show schematically transform coefficients 600 for encoding according to an example.

FIG. 6A shows transform coefficients that are obtained by a transform process such as the transform process 400 depicted in FIG. 4. The transform coefficients comprise one DC coefficient and seven AC coefficients. Each of the transform coefficients has a depth of 12 bits, ranging from a most significant bit to a least significant bit.

The transform coefficients are encodeable as a sequence of tiered bit-layers, as described with reference to FIGS. 5A and 5B.

In the example shown in FIGS. 6A and 6B, the fifth AC coefficient (the second d1 coefficient) has the smallest magnitude of the set of AC coefficients. The fifth AC coefficient in this case has only one non-zero bit which is the least significant bit of that AC coefficient.

In this example, the encoder determines whether the smallest magnitude AC coefficient is to be omitted from the encoding or included in the encoding. If it is determined that the smallest magnitude AC coefficient is to be omitted, the smallest magnitude AC coefficient is discarded. The smallest magnitude AC coefficient is an example of an additional transform coefficient, relative to a plurality of transform coefficients comprising the AC coefficients which are ultimately encoded.

The smallest magnitude AC coefficient may be determined using a magnitude comparator arranged to compare the values of the AC coefficients and derive a minimum.

The determination of whether the smallest magnitude AC coefficient is to be omitted may be performed on the basis of the value of the smallest magnitude AC coefficient and the bit-budget allocated for the encoding of the AC coefficients. For example, it may be determined that, based on the available bit-budget and the value of the smallest magnitude AC coefficient, the first non-zero bit of the smallest magnitude AC coefficient will not be reached before the bit-budget is used up. In some examples, for example where one or more most significant bit-layers are omitted from the encoding, the determination is also based on the number of bit-layers that are omitted. If the encoder starts encoding from a relatively high bit-layer (that is, if no bit-layers or relatively few bit-layers are omitted), it is more likely that the bit-budget will be used up before the first non-zero bit of the smallest magnitude AC coefficient has been reached. As such, if the smallest magnitude AC coefficient is included in the encoding, only zeros are transmitted for this coefficient, resulting in wasted bits. By choosing to omit the smallest magnitude AC coefficient, wastage can be reduced and more bits can consequently be spent on the remaining AC coefficients.

In the example shown in FIG. 6B, the extra bits resulting from omitting the smallest magnitude AC coefficient, which would not be available if the smallest AC coefficient were not omitted, are shown with dotted shading. As such, these larger magnitude AC coefficients are encoded with a greater number of bits without changing the compression level, resulting in an increased visual quality. The bits of the omitted AC coefficient are depicted in FIG. 6B with crosses.

In the example shown in FIGS. 6A and 6B, where the compression level is 2:1, the bit-budget allocated to the encoding of the AC coefficients is 26 bits as described above with reference to FIGS. 5A and 5B. By discarding one of the AC coefficients, six AC coefficients are output instead of seven. Thus each bit-layer that is encoded comprises 6 bits instead of 7 bits. Further, the sign bit for the omitted coefficient is also omitted. As such, more bits may be allocated to each of the remaining AC coefficients compared to a case in which no AC coefficient is omitted. Where the compression level is 2:1 for a 12-bit coefficient depth, 4 bits per coefficient may be used when encoding 6 AC coefficients, instead of 3.71 bits per coefficient in a case where 7 AC coefficients are encoded. For a 16-bit coefficient depth, 6 bits per coefficient may be used when encoding 6 AC coefficients compared with 5.4 bits per coefficient for encoding 7 AC coefficients.

If the smallest magnitude AC coefficient is omitted from the encoding, an omitted coefficient identifier may be included to identify the AC coefficient that is omitted. The omitted coefficient identifier enables a decoder to determine which AC coefficient has been omitted from the encoding. The omitted coefficient identifier may be arranged in a header. Such a header may also comprise the bit-layer indicator described above, in some examples. In some examples, the header comprises the omitted coefficient identifier but not the bit-layer indicator.

The omitted coefficient identifier may have a bit-length of 3 bits, although other bit-lengths may be used in other examples. The omitted coefficient identifier may have a fixed bit-length or a variable bit-length.

In some examples, more than one AC coefficient is omitted from the encoding. In some examples, if more than one AC coefficient has the smallest magnitude, the AC coefficient corresponding to the higher frequency is omitted instead of the AC coefficient corresponding to the lower frequency.

Omitting one or more AC coefficients may result in savings where the distribution of coefficients is relatively non-uniform. That is, where there is a relatively large difference between the values of the greatest and the smallest magnitude AC coefficients. This may be the case for regions of an image containing edges or other features that result in a relatively high level of visual complexity.

In some examples, a predefined encoder parameter is used to determine whether or not the smallest magnitude AC coefficient is to be omitted from the encoding. The parameter represents a threshold value against which the encoder compares the value of the bit-layer indicator, i.e. the number of leading bit-layers to be omitted. For example, where the bit-layer indicator is a small value, indicating relatively few omitted leading bit-layers, it may be less likely that the most significant non-zero bit of the smallest magnitude AC coefficient will be reached before the bit-budget is used up, compared to a case in which the bit-layer indicator is a large value indicating a greater number of omitted leading bit-layers. Therefore, the smallest magnitude AC coefficient may be discarded on the basis that relatively few leading bit-layers are omitted. Different parameters may be defined for different compression levels and different pixel depths. Such threshold parameters may be stored in a look-up table, for example.

Figure 7A:
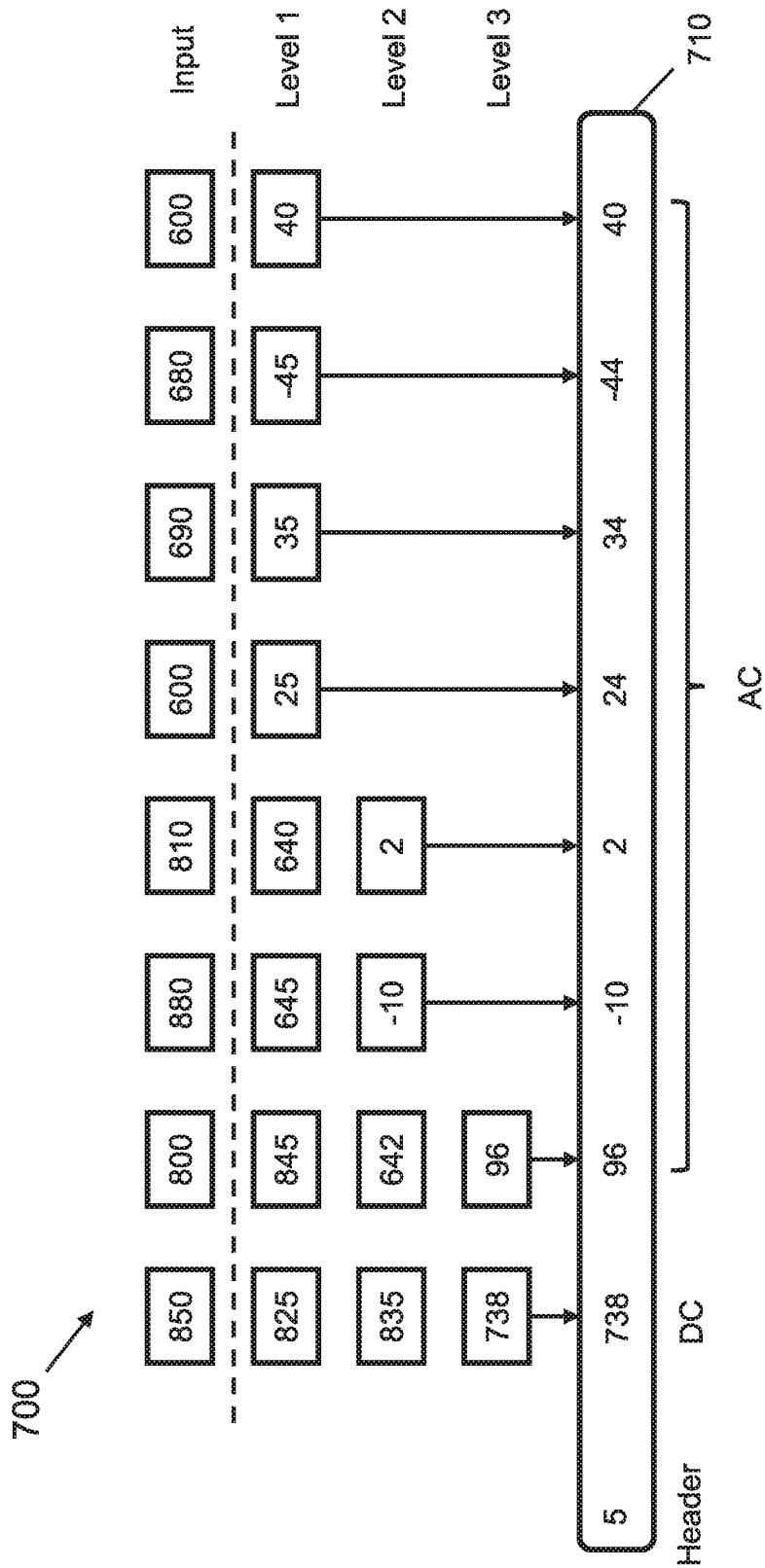
FIGS. 7A to 7C show schematically encoded data according to an example.
Figure 7B:
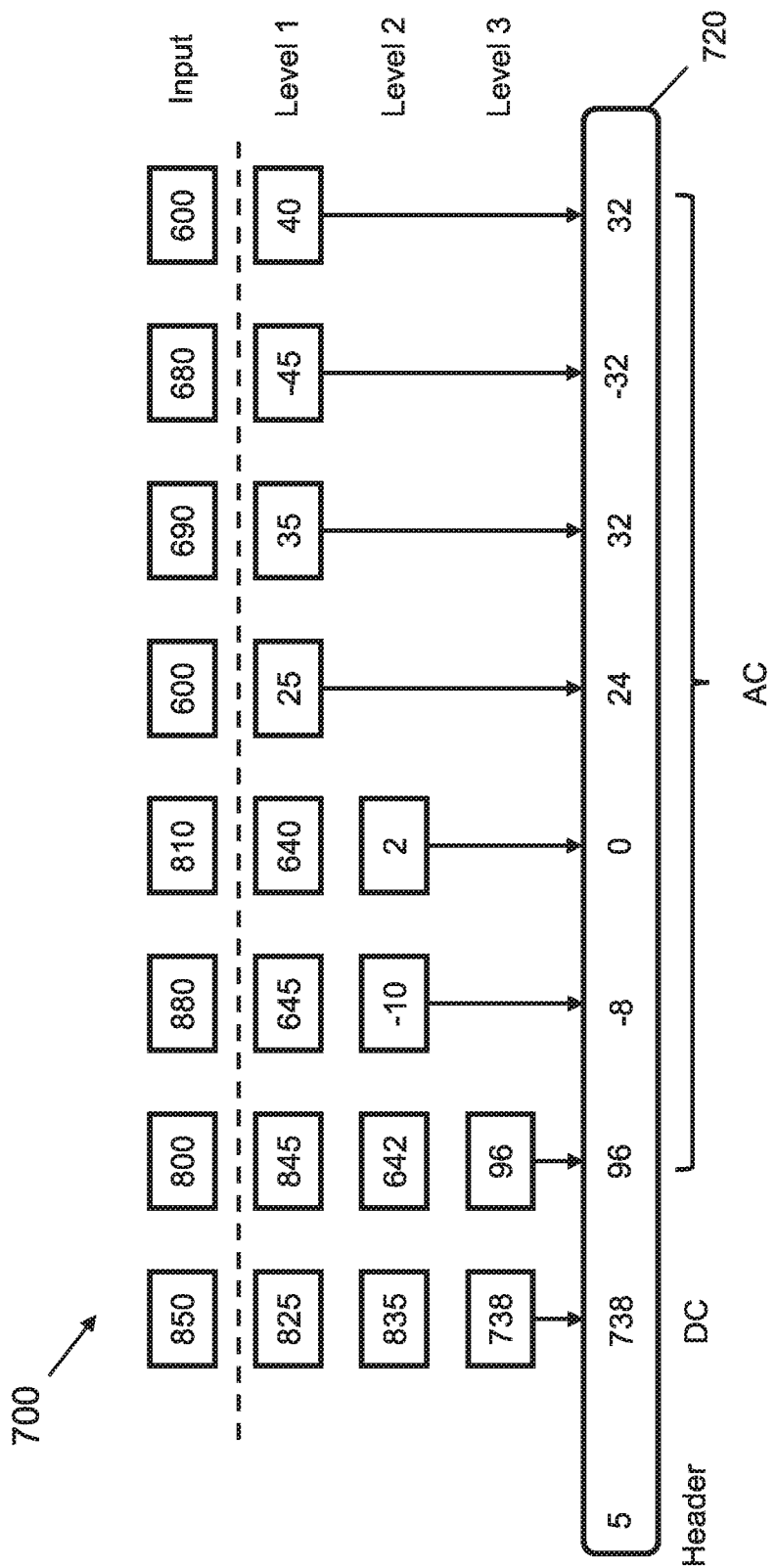
Figure 7C:
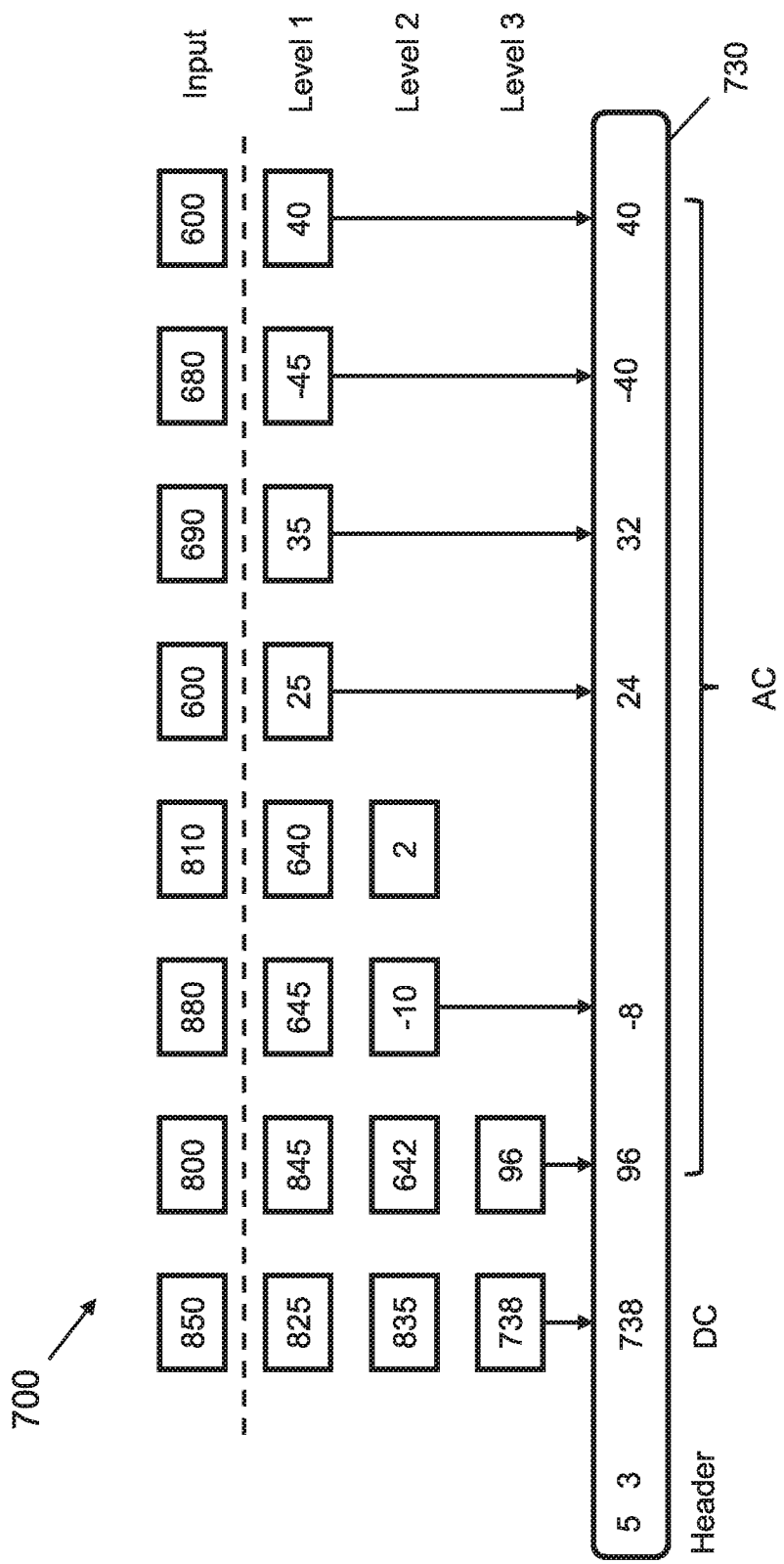

FIGS. 7A to 7C show schematically a numerical example of encoded data. In each of FIGS. 7A to 7C, a 3-level Haar transform is applied to a group of 8 pixels 700, each pixel having a depth of 12 bits per pixel.

Referring first to FIG. 7A, the compression level is set to 3:2. The output data 710 includes a 3 bit header to indicate the number of most significant bit-layers that are omitted from the encoding of the AC coefficients. In this case, the AC coefficient having the highest value is the first AC coefficient, with a value of 96, a 7 bit value. As such, the first 5 (12−7) most significant bit-layers contain only zeros in this example. These 5 bit-layers are omitted from the encoding. The 3-bit header has a value of 5, to indicate the number of bit-layers that are omitted.

Turning to FIG. 7B, the compression level is set to 2:1. Therefore, the available bit-budget for encoding the AC coefficients in this case is smaller than that for the example shown in FIG. 7A. The smallest magnitude AC coefficient has a value of 2, and the encoder reaches the limit of the bit-budget before the first non-zero bit of this AC coefficient has been reached. Therefore the value of this AC coefficient in the output data 720 is zero.

In the example shown in FIG. 7C, the smallest magnitude AC coefficient is omitted from the encoding. A determination is made to omit this AC coefficient on the basis that the first non-zero bit for this coefficient will not be reached before the bit-budget is used up. Discarding this AC coefficient allows extra bits to be used to encode the remaining AC coefficients, thus reducing an amount of information that is lost in encoding these remaining coefficients. In this example, the header of the output data 730 includes an omitted coefficient identifier to point to the location of the omitted coefficient. The omitted coefficient identifier has a value of 3 to indicate that it is the $3^{rd}$ AC coefficient that is being omitted from the encoding.

The compression level defines a trade-off between image quality and savings in memory, memory bandwidth and power consumption. The compression level may be an input from a user, who, for example, can adjust the compression level according to their requirements. The compression level used may be indicated to the decoder in the form of a parameter in the encoded data. Different compression levels may be used for static and dynamic image content.

As described above, transform operations may be performed independently on left and right portions of a line of pixels. Each transform operation is used to obtain a respective plurality of transform coefficients for each line portion. In some examples, the transform coefficients from one line portion, e.g. the left portion, are compared with the transform coefficients from the other line portion, e.g. the right portion. The respective pluralities of transform coefficients may be encoded on the basis of such a comparison.

In an example, the AC coefficients of the two line portions are analyzed to identify the bit-layer for each line portion that contains the most significant non-zero bit. This bit-layer can be determined based on the value of the greatest magnitude AC coefficient for each line portion. If the most significant non-zero bit for each line portion belongs to the same bit-layer, the AC coefficients for both line portions are encoded using the same bit-budget. If, however, the bit-layer containing the most significant non-zero bit differs between line portions, the encoder can allocate different bit-budgets to the different line portions, in order to favor the line portion having the greater magnitude AC coefficient. As such, a higher bit-budget can be allocated to the line portion having the greater magnitude AC coefficient and a lower bit-budget can be allocated to the other line portion. The overall bit-budget for the two line portions may remain unchanged. In one example, for each bit-layer difference between the greatest magnitude AC coefficient of the two line portions, 3 bits are added to the bit-budget for encoding the line portion having the greater magnitude AC coefficient, and the bit-budget for encoding the other line portion is complementarily reduced by 3 bits. For example, if the greatest magnitude AC coefficient for a left line portion requires 2 more bits to represent it than is required for the greatest magnitude AC coefficient for the right line portion, the bit-budget for the left line portion may be increased by 3×2=6 bits, and the bit-budget for the right line portion may be decreased correspondingly such that the overall bit-budget for the line portions remains the same.

Adjusting the bit-budgets according to the requirements of the left and right line portions facilitates efficient use of resources and an increase in visual quality. For example, where the image content of the left line portion is flat and the image content of the right line portion contains an edge or other detail, the AC coefficients of the right line portion are likely to be greater in magnitude than those of the left line portion. Consequently, bit-budget can be shifted from the flat region, where information loss due to compression is less visually noticeable, to the edge region, where information loss is more visually noticeable. Thus visual quality can be increased without having to increase the overall bit-budget for the two line portions. Dynamic bit-budget allocation, or rate control, is performed on a single line of pixels divided into two or more portions or segments. Performing bit-budget allocation on portions of a line of pixels independently of other lines of pixels is less computationally expensive than some known rate control techniques. Such known techniques require multiple lines of an image to be stored and/or analyzed. Storing and analyzing multiple lines of image may be undesirable in terms of memory and/or processing requirements.

In some examples, a predefined encoder parameter is used to adjust the bit-budget between line portions. The parameter represents a threshold value against which the difference between the bit-layers containing the first most significant non-zero bits for each line portion can be compared. Different parameters may be defined for different compression levels and different pixel depths. Such threshold parameters may be stored in a look-up table, for example.

Encoded data generated by the encoder may be chopped into desired word lengths by a wrapper function. The word lengths may be specified by a frame writer or memory writer. The wrapper function may pack the compressed coefficient data along with metadata. Metadata corresponding to a group of 16 pixels (left and right line portions of 8 pixels each), or 32 pixels in the RAW domain, are packed together with the compressed coefficient data. The metadata may be packed uncompressed with the compressed coefficient data. This combined packet can then be serialized to an arbitrary length of words, e.g. for feeding to a memory writer. In some examples, the packet is divided into 16 bit or 32 bit chunks, for example where a memory writer supports such word lengths. In other examples, the memory writer is adapted to handle larger chunks of data. In such examples, fewer clock cycles are required to transfer data between the encoder and the memory writer and between a memory reader and the decoder, compared to a case in which smaller chunks of data are used. Adapting a memory writer and/or memory reader to support an entire packet length produced by the encoder reduces a need to serialize the output of the encoder and de-serialize the input of the decoder.

In some examples, the compressed coefficient data is written to memory in accordance with an address for the group of pixels corresponding to the transform coefficients. The address may be given in bits, pointing to the starting location of the current group of pixels. An offset parameter may be used to represent the location of the first group of pixels in a given image. Co-ordinate parameters may be used to represent the column and row information of a current pixel within the group. The depth of the input pixels and/or the depth of metadata associated with the input pixels may also be indicated in the address information.

Figure 8:
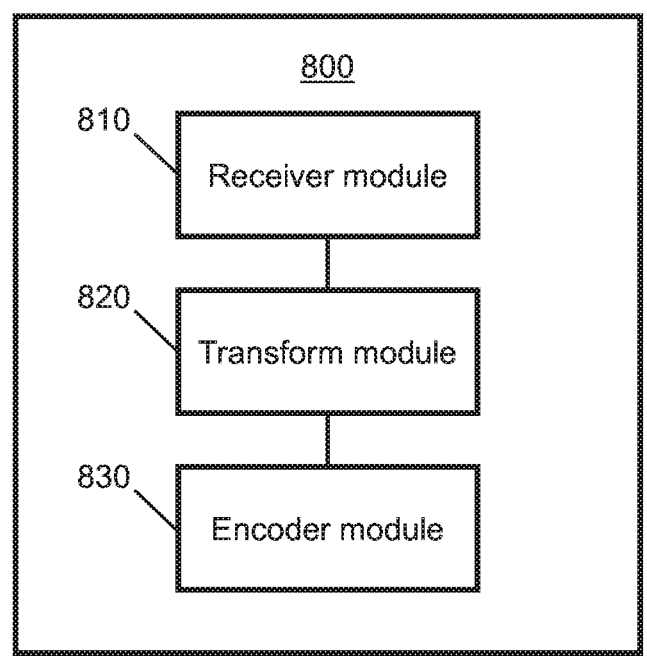
FIG. 8 shows schematically an apparatus for implementing methods such as the method of FIG. 2.

FIG. 8 shows schematically an apparatus 800 for processing image data according to an aspect of the present disclosure. The apparatus 800 may be configured to implement certain methods described herein, such as the method 200 shown in FIG. 2.

The apparatus 800 comprises a receiver module 810. Operations performed by the receiver module 810 may be carried out by hardware and/or software. The receiver module 810 is configured to receive data elements defining a portion of a line of pixels of an image. The image comprises one or more lines of pixels definable by one or more respective sets of data elements.

The apparatus 800 comprises a transform module 820. Operations performed by the transform module 820 may be carried out by hardware and/or software. The transform module 820 is configured to perform a transform operation on the received data elements to obtain a plurality of binary transform coefficients. The plurality of transform coefficients may be representative of frequency components of the received data elements. The transform operation is performed independently of data elements defining any other line of pixels.

The apparatus 800 comprises an encoder module 830. Operations performed by the encoder module 830 may be carried out by hardware and/or software. The encoder module 830 is configured to encode the plurality of transform coefficients as a sequence of tiered bit-layers. Each bit-layer in the sequence of bit-layers comprises a set of bits corresponding to a given bit position in each of the plurality of transform coefficients. The encoder module 830 is configured to output the encoded plurality of transform coefficients.

In some examples, the apparatus 800 further comprises an image sensor and/or a framebuffer or other memory.

Figure 9:
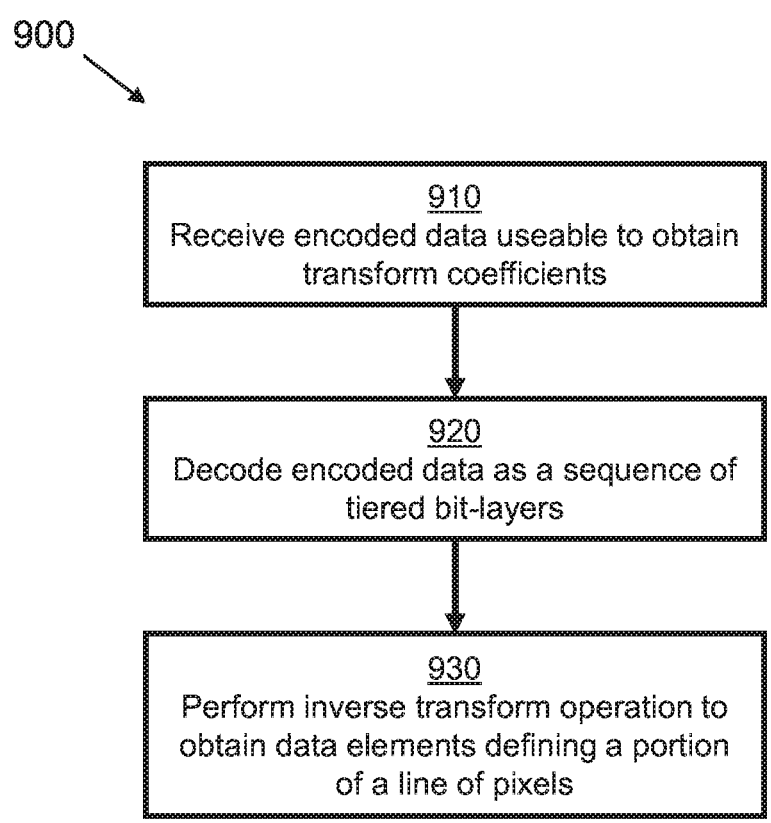
FIG. 9 shows schematically a method of processing image data.

FIG. 9 shows schematically a method 900 for processing image data according to an aspect of the present disclosure. The method 900 may be implemented by a decoder apparatus, for example. In an example, at least one portion of the method 900 is implemented by executable code, stored on a non-transitory storage medium, that includes instructions, that when executed by at least one processor, causes the at least one processor to perform the at least one portion of the method 900 described herein. In another case, at least one portion of the method 900 is implemented by at least one ASIC.

At block 910, encoded data is received which, when decoded, is useable to obtain a plurality of binary transform coefficients. The plurality of transform coefficients is representative of data elements defining a portion of a line of pixels of an image, the image comprising one or more lines of pixels definable by one or more respective sets of data elements. In some examples, the plurality of transform coefficients is representative of frequency components of the data elements defining the portion of the line of pixels. The plurality of transform coefficients is independent of data elements defining any other line of pixels.

At block 920, the received encoded data is decoded to obtain the plurality of transform coefficients. The encoded data is decoded as a sequence of tiered bit-layers, each bit-layer in the sequence of bit-layers comprising a set of bits corresponding to a given bit position in each of the plurality of transform coefficients.

At block 930, an inverse transform operation is performed on the plurality of transform coefficients to obtain the data elements.

In some examples, the received encoded data comprises a bit-layer indicator arranged to indicate a number of bit-layers in a subset of bit-layers, the subset of bit-layers having been omitted from the encoding of the plurality of transform coefficients. The subset of bit-layers includes a bit-layer comprising a most significant bit of each of the plurality of transform coefficients. In some examples, the bit-layer indicator indicates which bit-layer is the first bit-layer to be decoded. The bit-layer indicator enables the decoder to decode the encoded data more accurately compared to a case in which no bit-layer indicator is included.

In some examples, the received encoded data comprises an omitted coefficient identifier arranged to identify one or more transform coefficients that have been omitted from the encoding. The omitted coefficient identifier enables the decoder to determine which transform coefficients each of the decoded bits relates to.

In some examples, the decoder sets bits belonging to the first missing bit-layer to 1. The first missing bit-layer is the bit-layer following the least significant bit-layer to have been encoded. In other words, the first missing bit-layer is the first bit-layer not received by the decoder for a given plurality of transform coefficients. Setting the bits of the first missing bit-layer to 1 reduces an average error in the decoded values. For example, where the four least significant bit-layers are not output by the encoder, the default values of the bits in these missing bit-layers may be 0 (e.g. 0000). However, the four least significant bit-layers could potentially represent any value between 0 and 15. If the original value was 0, then there is no error in setting the bits of the missing bit-layers to 0. However, if the original value was 15, there is a relatively large error in setting the bits of the missing bit-layers to 0 (e.g. going from an original value of 15 to a decoded value of 0). By setting the bits in the first missing bit-layer to 1, the final value takes an average value for the missing bit-layers. For the example of four missing bit-layers, setting the bits of the first missing bit-layer to 1 results in a decoded value of 7 (1000) instead of 0 (0000) for the missing bit-layers. Thus the average error in the decoded values is reduced, increasing a decoding accuracy and reducing information loss. Setting the bits belonging to the first missing bit-layer to 1 may be considered to be an addition of noise. In some examples, the decoder does not set bits belonging to the first missing bit-layer to 1 for a coefficient that has been discarded in the encoding. The decoder may take the decoded value of the discarded coefficient to be zero.

Figure 10:
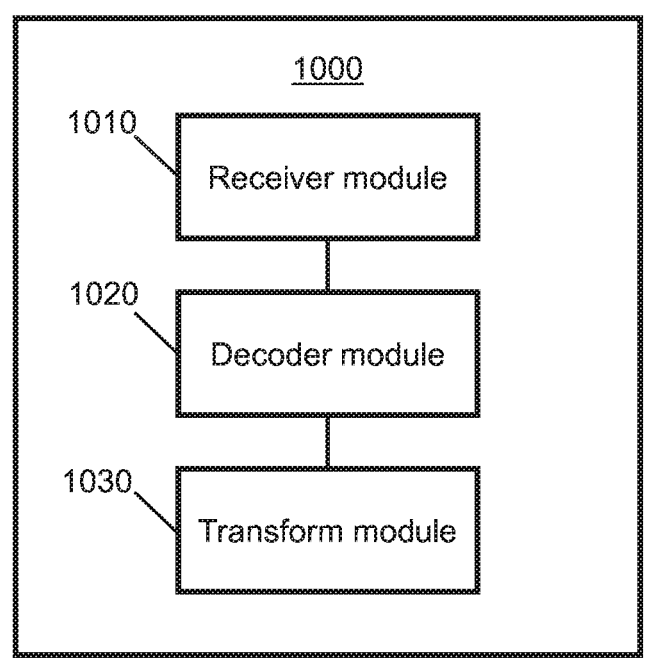
FIG. 10 shows schematically an apparatus for implementing methods such as the method of FIG. 9.

FIG. 10 shows schematically an apparatus 1000 for processing image data according to an aspect of the present disclosure. The apparatus 1000 may be configured to implement certain methods described herein, such as the method 900 shown in FIG. 9.

The apparatus 1000 comprises a receiver module 1010. Operations performed by the receiver module 1010 may be carried out by hardware and/or software. The receiver module 1010 is configured to receive encoded data which, when decoded, is useable to obtain a plurality of binary transform coefficients representative of data elements defining a portion of a line of pixels of an image. In some examples, the plurality of binary transform coefficients is representative of frequency components of the data elements defining the portion of the line of pixels. The plurality of transform coefficients is independent of data elements defining any other line of pixels.

The apparatus 1000 comprises a decoder module 1020. Operations performed by the decoder module 1020 may be carried out by hardware and/or software. The decoder module 1020 is configured to decode the received encoded data as a sequence of tiered bit-layers, each bit-layer in the sequence of bit-layers comprising a set of bits corresponding to a given bit position in each of the plurality of transform coefficients.

The apparatus 1000 comprises a transform module 1030. Operations performed by the transform module 1020 may be carried out by hardware and/or software. The transform module 1030 is configured to perform an inverse transform operation on the plurality of transform coefficients to obtain the data elements.

Figure 11:
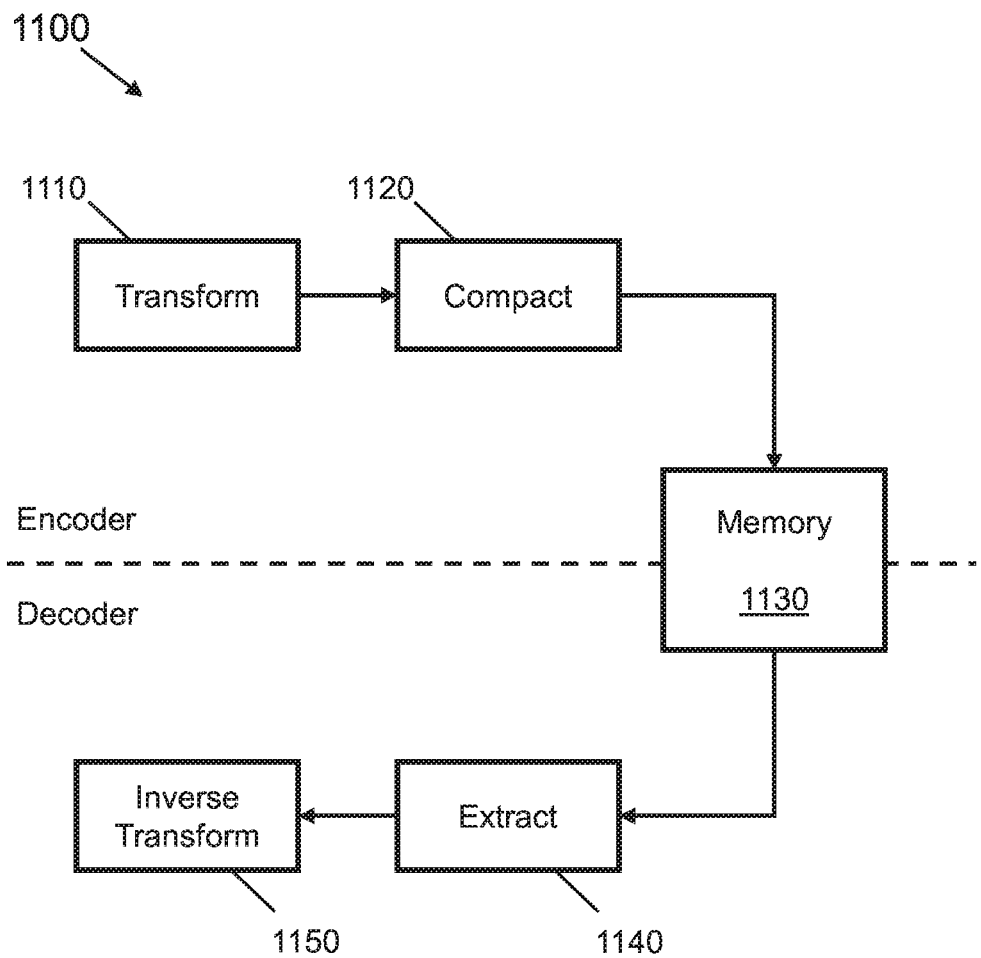
FIG. 11 shows schematically an image processing arrangement.

FIG. 11 shows schematically an image processing arrangement 1100. The image processing arrangement 1100 may be implemented to perform certain methods described herein. The image processing arrangement 1100 comprises functions performed by an encoder and functions performed by a decoder, as illustrated by a dashed line in FIG. 11. The functions comprised in the image processing arrangement 1100 may be implemented as hardware and/or software functions.

The encoder uses a transform function 1110 to perform a transform operation on input data elements, e.g. data elements defining a portion of a line of pixels. The transform function 1110 generates transform coefficients, which may for example be representative of frequency components of the input data elements.

A compactor function 1120 of the encoder receives and compacts the transform coefficients. The transform coefficients may be compacted according to a predefined compression level, for example. Compacting the transform coefficients may involve encoding the transform coefficients on a bit-layer by bit-layer basis, from low frequency to high frequency coefficients, until a bit-budget defined by the compression level has been reached. In some examples, compacting the transform coefficients comprises discarding one or more of the transform coefficients. In some examples, compacting the transform coefficients comprises discarding one or more bit-layers, including the most significant bit-layer, containing only zeros. The encoder writes the compacted transform coefficients to memory 1130.

The decoder reads from memory 1130 and extracts the transform coefficients using an extractor function 1140. The decoder then performs an inverse transform operation using an inverse transform function 1150 to obtain data elements representative of the input data.

The above examples are to be understood as illustrative. Further examples are envisaged.

In some examples described above, an encoder receives raw image data from an image sensor and compresses the raw image data. In other examples, the encoder receives image data that has been processed according to a predetermined format, e.g. a JPEG image. Other examples of image data formats that can be used in accordance with the methods described herein include, but are not limited to: RGB, YCbCr 4:4:4, YCbCr 4:2:2, and YCbCr 4:2:0.

In some examples described above, image data corresponding to a single line of pixels, or a portion of such a line, is processed independently of image data corresponding to any other line of pixels. In other examples, image data corresponding to a plurality of lines of pixels, e.g. 2 adjacent lines of pixels, is processed together.

In some examples described above, an encoder receives input data from an image sensor. In other examples, the encoder receives input data from memory.

Examples described above relate to image data. In other examples, other types of signal data is processed in a similar manner Examples of other types of signal data include, but are not limited to, audio data, volumetric signal data and video data.

In some examples, an encoder receives image data defining pixels in an image. A transform operation is performed on the received image data to obtain a plurality of binary transform coefficients. The transform coefficients may, for example, represent frequency components of the received image data. The plurality of transform coefficients is encoded as a sequence of tiered bit-layers, each bit-layer in the sequence of bit-layers comprising a set of bits corresponding to a given bit position in each of the plurality of transform coefficients. A determination is made that at least one transform coefficient of the plurality of transform coefficients is to be omitted from said encoding. The determination is based at least in part on: a value of the at least one transform coefficient, and a bit-budget allocated for the encoding of the plurality of transform coefficients. Based on the determination, the at least one transform coefficient is omitted from said encoding.

In some examples, a decoder receives encoded data which, when decoded, is useable to obtain a plurality of binary transform coefficients. The transform coefficients may, for example, represent frequency components of image data. The encoded data comprises an omitted coefficient identifier arranged to identify a further transform coefficient, the further transform coefficient having been omitted from the encoding of the plurality of transform coefficients based at least in part on a value of the further transform coefficient and a bit-budget allocated for the encoding of the plurality of transform coefficients. The received encoded data is decoded to obtain the plurality of transform coefficients, wherein the encoded data is decoded as a sequence of tiered bit-layers, each bit-layer in the sequence of bit-layers comprising a set of bits corresponding to a given bit position in each of the plurality of transform coefficients.

In some examples, an encoder receives first data elements defining a first portion of a line of pixels of an image, the image comprising one or more lines of pixels definable by one or more respective sets of data elements. Second data elements are received, defining a second portion of the line of pixels. A first transform operation is performed on the first data elements to obtain a first plurality of binary transform coefficients representative of frequency components of the first data elements. The first transform operation is performed independently of data elements defining any other line of pixels. A second transform operation is performed on the second data elements to obtain a second plurality of binary transform coefficients representative of frequency components of the second data elements. The second transform operation is performed independently of data elements defining any other line of pixels. The first plurality of transform coefficients is compared with the second plurality of transform coefficients. The comparison may comprise, for example, comparing a value of one or more of the first plurality of transform coefficients with a value of one or more of the second plurality of transform coefficients. Based on the comparison, a first bit-budget is allocated for encoding the first plurality of transform coefficients and a second bit-budget is allocated for encoding the second plurality of transform coefficients. The first bit-budget may be different from the second bit-budget. The first and second pluralities of transform coefficients are encoded in accordance with the first and second bit-budgets, respectively.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method for processing image data, the method comprising:
    receiving data elements defining a portion of a line of pixels of an image, the image comprising one or more lines of pixels definable by one or more respective sets of data elements;
    performing a transform operation on the received data elements to obtain a plurality of binary transform coefficients, wherein the transform operation is performed independently of data elements defining any other line of pixels;
    encoding the plurality of transform coefficients as a sequence of tiered bit-layers, each bit-layer in the sequence of bit-layers comprising a set of bits corresponding to a given bit position in each of the plurality of transform coefficients;
    outputting the encoded plurality of transform coefficients;
    receiving further data elements defining a further portion of said line of pixels of the image;
    performing a transform operation on the received further data elements to obtain a further plurality of binary transform coefficients;
    comparing the plurality of transform coefficients with the further plurality of transform coefficients; and
    encoding one or both of the plurality of transform coefficients and the further plurality of transform coefficients based on the comparing.

2. A method according to claim 1, the method comprising:
    identifying bits encodable as a subset of bit-layers from the sequence of bit-layers on the basis of each of the bits having a predetermined value, the subset including a bit-layer comprising a most significant bit of each of the plurality of transform coefficients; and
    omitting the identified bits in said encoding.

3. A method according to claim 2, the method comprising including in said encoding a bit-layer indicator to indicate the number of bit-layers in the subset.

4. A method according to claim 3, wherein the bit-layer indicator is arranged to indicate a bit-layer of the sequence of bit-layers that contains the first most significant non-zero value.

5. A method according to claim 2, wherein the subset of bit-layers is contiguous in the sequence of bit-layers.

6. A method according to claim 2, the method comprising:
obtaining a further binary transform coefficient corresponding to the received data elements; and
encoding the further transform coefficient as a sequence of bits,
wherein the number of bits of the further transform coefficient that are included in the encoding of the further transform coefficient is greater than the number of bit-layers that are included in the encoding of the plurality of transform coefficients.

7. A method according to claim 6,
wherein the plurality of transform coefficients comprises a plurality of detail coefficients derived based on differences between at least some of the received data elements, and
wherein the further transform coefficient comprises an average coefficient derived based on one or more averages between at least some of the received data elements.

8. A method according to claim 1, wherein the performing the transform operation comprises performing a Discrete Wavelet Transform, DWT, operation.

9. A method according to claim 8, wherein the DWT operation comprises a Haar transform operation.

10. A method according to claim 1, wherein the received data elements comprise raw image data output from an image sensor.

11. A method according to claim 10,
wherein the receiving the data elements comprises receiving the data elements from the image sensor, and
wherein the outputting the encoded plurality of transform coefficients comprises outputting the encoded plurality of transform coefficients to memory and/or for transmission to at least one further entity.

12. A method according to claim 1, comprising:
obtaining an additional binary transform coefficient corresponding to the received data elements; and
determining whether the additional transform coefficient is to be omitted from said encoding or included in said encoding on the basis of:
a value of the additional transform coefficient; and
a bit-budget allocated for the encoding of the plurality of transform coefficients.

13. A method according to claim 12, comprising, in response to determining that the additional transform coefficient is to be omitted from said encoding, including in said encoding an omitted coefficient identifier to identify the additional transform coefficient that is to be omitted from said encoding.

14. A method according to claim 1, wherein the portion of the line of pixels and the further portion of the line of pixels are contiguous portions of the line of pixels.

15. A method according to claim 1, comprising, based on the comparing, allocating a first bit-budget for the encoding of the plurality of transform coefficients and allocating a second bit-budget, different from the first bit-budget, for the encoding of the further plurality of transform coefficients.

16. Apparatus for processing image data, the apparatus comprising:
a receiver module configured to:
receive data elements defining a portion of a line of pixels of an image, the image comprising one or more lines of pixels definable by one or more respective sets of data elements; and
receive further data elements defining a further portion of said line of pixels of the image;
a transform module configured to:
perform a transform operation on the received data elements to obtain a plurality of binary transform coefficients, wherein the transform operation is performed independently of data elements defining any other line of pixels; and
perform a transform operation on the received further data elements to obtain a further plurality of binary transform coefficients and compare the plurality of transform coefficients with the further plurality of transform coefficients; and
an encoder module configured to:
encode the plurality of transform coefficients as a sequence of tiered bit-layers, each bit-layer in the sequence of bit-layers comprising a set of bits corresponding to a given bit position in each of the plurality of transform coefficients;
encode one or both of the plurality of transform coefficients and the further plurality of transform coefficients based on the comparing; and
output the encoded plurality of transform coefficients.

17. A non-transitory, computer-readable storage medium comprising a set of computer-readable instructions which, when executed by at least one processor, cause the at least one processor to:
receive data elements defining a portion of a line of pixels of an image, the image comprising one or more lines of pixels definable by one or more respective sets of data elements;
perform a transform operation on the received data elements to obtain a plurality of binary transform coefficients, wherein the transform operation is performed independently of data elements defining any other line of pixels;
encode the plurality of transform coefficients as a sequence of tiered bit-layers, each bit-layer in the sequence of bit-layers comprising a set of bits corresponding to a given bit position in each of the plurality of transform coefficients;
output the encoded plurality of transform coefficients;
receive further data elements defining a further portion of said line of pixels of the image;
perform a transform operation on the received further data elements to obtain a further plurality of binary transform coefficients;
compare the plurality of transform coefficients with the further plurality of transform coefficients; and
encode one or both of the plurality of transform coefficients and the further plurality of transform coefficients based on the comparing.

18. A method for processing image data, the method comprising:
receiving encoded data which, when decoded, is useable to obtain a plurality of binary transform coefficients representative of data elements defining a portion of a line of pixels of an image, the image comprising one or more lines of pixels definable by one or more respective sets of data elements, the plurality of transform coefficients being independent of data elements defining any other line of pixels;

decoding the received encoded data to obtain the plurality of transform coefficients, wherein the encoded data is decoded as a sequence of tiered bit-layers, each bit-layer in the sequence of bit-layers comprising a set of bits corresponding to a given bit position in each of the plurality of transform coefficients; and performing an inverse transform operation on the plurality of transform coefficients to obtain the data elements, wherein the method is useable to obtain one or both of the plurality of binary transform coefficients and a further plurality of transform coefficients representative of further data elements defining a further portion of said line of pixels of the image, the one or both of the plurality of transform coefficients and the further plurality of transform coefficients having been encoded in the encoded data based on a comparison of the plurality of transform coefficients with the further plurality of transform coefficients.

19. Apparatus for processing image data, the apparatus comprising:
   a receiver module configured to receive encoded data which, when decoded, is useable to obtain a plurality of binary transform coefficients representative of data elements defining a portion of a line of pixels of an image, the image comprising one or more lines of pixels definable by one or more respective sets of data elements, the plurality of transform coefficients being independent of data elements defining any other line of pixels;
   a decoder module configured to decode the received encoded data to obtain the plurality of transform coefficients, wherein the decoder module is configured to decode the received encoded data as a sequence of tiered bit-layers, each bit-layer in the sequence of bit-layers comprising a set of bits corresponding to a given bit position in each of the plurality of transform coefficients; and
   a transform module configured to perform an inverse transform operation on the plurality of transform coefficients to obtain the data elements, wherein the apparatus is useable to obtain one or both of the plurality of binary transform coefficients and a further plurality of transform coefficients representative of further data elements defining a further portion of said line of pixels of the image, the one or both of the plurality of transform coefficients and the further plurality of transform coefficients having been encoded in the encoded data based on a comparison of the plurality of transform coefficients with the further plurality of transform coefficients.

20. A non-transitory, computer-readable storage medium comprising a set of computer-readable instructions which, when executed by at least one processor, cause the at least one processor to:
   receive encoded data which, when decoded, is useable to obtain a plurality of binary transform coefficients representative of data elements defining a portion of a line of pixels of an image, the image comprising one or more lines of pixels definable by one or more respective sets of data elements, the plurality of transform coefficients being independent of data elements defining any other line of pixels;
   decode the received encoded data to obtain the plurality of transform coefficients, wherein the encoded data is decoded as a sequence of tiered bit-layers, each bit-layer in the sequence of bit-layers comprising a set of bits corresponding to a given bit position in each of the plurality of transform coefficients; and
   perform an inverse transform operation on the plurality of transform coefficients to obtain the data elements, wherein the non-transitory, computer-readable medium is useable to obtain one or both of the plurality of binary transform coefficients and a further plurality of transform coefficients representative of further data elements defining a further portion of said line of pixels of the image, the one or both of the plurality of transform coefficients and the further plurality of transform coefficients having been encoded in the encoded data based on a comparison of the plurality of transform coefficients with the further plurality of transform coefficients.

* * * * *